J. W. BECKMAN.
CULTIVATOR.
APPLICATION FILED OCT. 14, 1910.
986,674.
Patented Mar. 14, 1911.
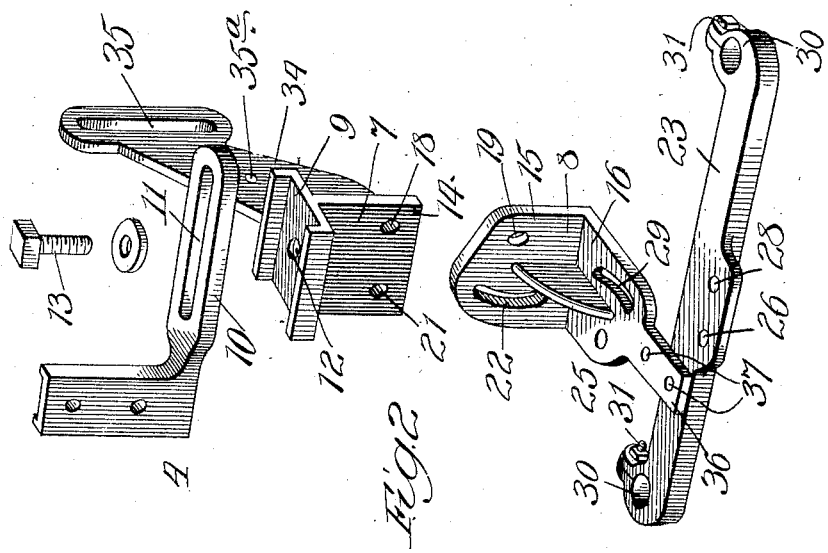
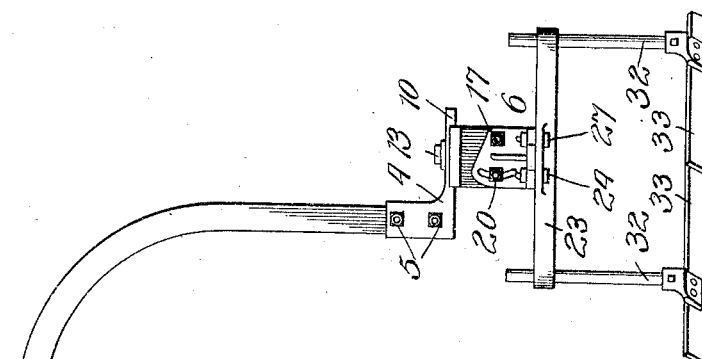
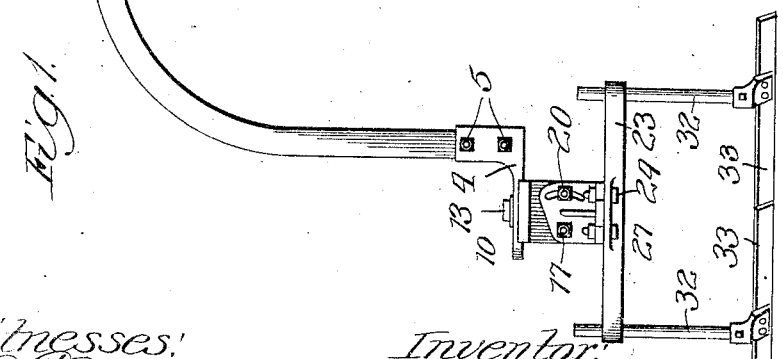
Witnesses:
Inventor:
James W. Beckman,

UNITED STATES PATENT OFFICE.

JAMES W. BECKMAN, OF CHICAGO, ILLINOIS.

CULTIVATOR.

986,674.  Specification of Letters Patent.  Patented Mar. 14, 1911.

Application filed October 14, 1910. Serial No. 587,066.

*To all whom it may concern:*

Be it known that I, JAMES W. BECKMAN, a citizen of the United States, residing at Chicago, in the county of Cook and State of Illinois, have invented a new and useful Improvement in Cultivators, of which the following is a specification.

My invention relates to the type of agricultural machines for cultivating growing crops known as cultivators, whether of the surface cultivating type, harrow, disk or any other type, which operate to work the ground for the purpose of eradicating weeds and leaving the dirt in loosened and soft condition, forming a mulch, around the stalks of the plants, and when desired to form the dirt in ridges about the stalks.

In order that a cultivator be adapted to properly perform the cultivating operation, it is necessary that the devices which engage with the ground for cultivating it be so supported that they may be adjusted in a horizontal plane, and to varying inclined positions thereto in a vertical plane. In constructions, as commonly provided, certain adjustments of the cultivator-devices are provided for, but these adjustments are of such a character as not to provide adjustments for all conditions of use; and furthermore, present objections which render uniform adjusting of all of the cultivator-devices a tedious operation.

My object, generally stated, is to provide improvements in cultivators to the end of rendering possible all of the required adjustments of the cultivator-devices and to permit such adjustments to be readily made.

Referring to the accompanying drawings, Figure 1 shows by a view in elevation a common form of arch-bar of a blade-cultivator equipped with crossheads and blades secured thereto in accordance with my invention; and Fig. 2, an enlarged perspective view of the connecting members between the arch-bar and the blades for providing adjustments of the latter, these members being shown in disassembled but relative positions.

As cultivators of the types to which my improvement relates are of well known form, I have illustrated the arch-bar only thereof, which is, as usual, supported on a wheel-supported frame (not shown) in such a manner as to permit it with its tilling attachments to be swung from side to side in order to prevent the uprooting or cutting of the stalks of plants where the latter are out of line, the arch-bar in the operation of the cultivator straddling the plants as the cultivator is moved along the ground on its wheels. The arch-bar illustrated at 3 is equipped at its lower ends with oppositely and outwardly extending members 4 bolted to the arch-bar, as represented at 5. Depending from each of the members 4 is a head 6 formed of two members 7 and 8. The member 7 is provided on its upper surface with a channel 9 adapted to receive an extension 10 on the member 4, which is slotted as represented at 11 and through which slot and an opening 12 in the adjacent member 7, a screw-bolt 13 extends, for securing the member 7 to the part 4 in adjustable position thereon. The member 7 is formed with a depending flange 14 which serves as a point of attachment for the other companion member 8 of the head 6, the member 8 being of angle construction affording an upwardly-extending plate 15 and a horizontally-extending plate 16. The plate 15 is pivoted to the flange 7, as by a bolt 17 passing through openings 18 and 19 in the parts 7 and 15 respectively, and to provide for the securing of the member 8 in any position of adjustment in the vertical plane about its pivot 17, I employ a bolt 20 which extends through an opening 21 in the member 7, and an arc-shaped approximately vertically-extending slot 22 in the member 15. Each of the plates 16 carries a bar 23, technically known as a crosshead, which extends transversely of the path in which the cultivator moves when in operation, these bars being pivoted to their supporting plates 16, as through the medium of bolts 24 passing through openings 25 and 26 in the plates 16 and bars 23 respectively. The bars 23 are adjustable on the plates 16 about their pivots 24, and to provide for the securing of the bars 23 in adjusted position, I provide bolts 27 which pass through holes 28 in the bars 23 in elongated arc-shaped slots 29 in the coöperating plates 16.

Each of the bars 23 terminates at its opposite ends in split sleeves 30 provided with clamping devices 31, which may be of any suitable construction and secured within these sleeves are depending rods 32 to the lower ends of which, as shown in Fig. 1, blades 33 of the usual construction are secured, the split-sleeves at the ends of the bars permitting the rods 32 to be secured therein in any position of adjustment desired.

The members 7 carry forwardly-projecting extensions 34 which contain in their forward ends elongated arc-shaped slots 35 and openings 35ª at which the draft-bars (not shown) usually provided in constructions of this character and connected with the tongue of the cultivator, are attached. Each plate 16 is provided with a rearward extension 36, apertured as represented at 37, to form a place of attachment for levelers which are commonly used in cultivators of this character.

It will be readily understood from the foregoing description that the adjustments provided between the members 8 and 7 and bar 23 permit the latter to be adjusted, as desired, in the horizontal plane and likewise in the vertical plane at the desired inclination to the horizontal, and that these adjustments form between the bars 23 and the arch-bar, joint connections whereby the blades 33 may be adjusted to the desired inclination to the horizontal plane, for varying the height to which the dirt is piled up around the stalks, and their inclination with relation to the line occupied by the plants, for varying the amount of dirt displaced. It will also be noted that by providing independent adjustments in accordance with the preferred embodiment of my invention, the adjustment of the blades in both the horizontal and vertical plane may be effected to a nicety, as the adjustment in each plane may be effected independently of the other. Furthermore, where each bar 23 supports two blades, the latter are caused to be adjusted simultaneously and thus the operation of setting the blades may be quickly effected.

It will be understood that while I have illustrated a cultivator in which blades form the cultivating-devices, my invention is not limited in its use to such a type of cultivator as it may be readily embodied in other types thereof, as for instance in those in which instead of using blades as the cultivating-devices, harrow-devices, disks or other suitable cultivating or tilling devices which it is desirable be adjusted as described of the blades, are employed. Thus by employing the term "cultivating" device in the claims I wish to be understood as meaning a blade, harrow, disk or any other suitable device which engages with the ground for tilling it.

What I claim as new and desire to secure by Letters Patent is—

1. In a cultivator, the combination of its arch-bar, members carried by the ends of said arch-bar and adjustable thereon crosswise of the bar and formed with forwardly projecting extensions affording means at which the draft mechanism of the cultivator may be adjustably secured, a cross-bar carrying the cultivating devices, and a head adjustably connecting said member and cross-bar together in planes extending at an angle to each other, for the purpose set forth.

2. In a cultivator, the combination with an arch-bar and a cross-bar carrying a cultivating device, of means for adjustably connecting said cross-bar to said arch-bar comprising a member connected with an end of the arch-bar and adjustable crosswise thereof and provided with a depending section and a forwarding projecting extension, which latter is adapted to be adjustably connected with the draft rigging of the cultivator, and a head provided with substantially vertical and horizontal surfaces, said head fitting at its vertical surface against said depending section and at its horizontal surface against said cross-bar, and means for clamping said head to said depending section and cross-bar in adjusted positions with relation thereto, for the purpose set forth.

JAMES W. BECKMAN.

In presence of—
P. J. MOYER,
OTTO C. BAUER.